(12) United States Patent
Sankaranarayanan et al.

(10) Patent No.: US 8,199,800 B2
(45) Date of Patent: Jun. 12, 2012

(54) OFF-TRACK AWARE EQUALIZER DESIGN FOR BIT-PATTERNED MEDIA

(75) Inventors: Sundararajan Sankaranarayanan, Wexford, PA (US); Mehmet Fatih Erden, Pittsburgh, PA (US); Raman Chatapuram Venkataramani, Pittsburgh, PA (US)

(73) Assignee: Seagate Technology LLC, Cupertino, CA (US)

( * ) Notice: Subject to any disclaimer, the term of this patent is extended or adjusted under 35 U.S.C. 154(b) by 902 days.

(21) Appl. No.: 12/185,707

(22) Filed: Aug. 4, 2008

(65) Prior Publication Data
US 2010/0027605 A1     Feb. 4, 2010

(51) Int. Cl.
H03H 7/30 (2006.01)
(52) U.S. Cl. ........................................................ 375/229
(58) Field of Classification Search ........... 375/229–236
See application file for complete search history.

(56) References Cited

U.S. PATENT DOCUMENTS

| | | | |
|---|---|---|---|
| 6,201,840 B1 | 3/2001 | Rub et al. | |
| 6,282,251 B1 | 8/2001 | Worstell | |
| 6,553,541 B1 | 4/2003 | Nikolic et al. | |
| 6,643,082 B1 | 11/2003 | Belser | |
| 7,184,237 B2 | 2/2007 | Shi | |
| 7,286,595 B2 | 10/2007 | Cideciyan et al. | |
| 2005/0128966 A1* | 6/2005 | Yee | 370/310 |
| 2005/0169412 A1 | 8/2005 | Yang et al. | |
| 2005/0289443 A1 | 12/2005 | Kuznetsov | |
| 2006/0156171 A1 | 7/2006 | Kuznetsov et al. | |
| 2006/0235919 A1 | 10/2006 | Lee et al. | |
| 2009/0052293 A1* | 2/2009 | Conway et al. | 369/59.1 |

OTHER PUBLICATIONS

Venkataramani, et al., "Optimal Channel Shortening Equalization for MIMO ISI Channels", pp. 1-6, Nov. 2008.

Moon, et al., "Equalization for Maximum Likelihood Detectors", IEEE Transactions on Magnetics, Mar. 1995, pp. 1083-1088, vol. 31, No. 2.

* cited by examiner

Primary Examiner — Kevin Kim
(74) Attorney, Agent, or Firm — Ladas & Parry, LLP

(57) ABSTRACT

An equalizer employed in conjunction with bit-patterned media (BPM) is designed to take advantage of a common topology associated with BPM in which each data track is comprised of a plurality of sub-tracks. The equalizer-target filter pair is designed as multiple-input/multiple-output (MIMO) system, in which the readback signal is divided into readback signals associated with each sub-track. The MIMO equalizer takes into account differences in the channel response associated with each sub-track. A detector is configured to receive a plurality of equalized inputs provided by the MIMO equalizer, wherein the detector generates in response estimates of the user data stored on each of the plurality of sub-tracks.

20 Claims, 10 Drawing Sheets

OFF-TRACK AWARE EQUALIZER DESIGN FOR BIT-PATTERNED MEDIA

BACKGROUND

The present invention relates to a system for retrieving data, and more particularly to equalizer-target filter pairs designed to retrieve data from bit-patterned magnetic media.

Magnetic media refers generally to disc drives that include one or more discs mounted for rotation on a hub or spindle. The disc drive is typically comprised of a plurality of concentric tracks. Information is stored to the magnetic media by controlling the direction of magnetization, and in particular, to controlling the transition between directions of magnetization along each concentric track. Thus, the transition (or lack thereof) between adjacent areas on the magnetic media defines whether a bit is a '1' or a '0'. The storage capacity of magnetic media is increased by continually decreasing the size of individual grains of magnetic material that defines the magnetic media. As the grain size decreases, the density of information that can be stored to the magnetic media increases.

The superparamagnetic limit, however, defines a limit to the size of individual grains, below which the grains become unstable and lose the ability to hold a particular direction of magnetization. A proposed solution to limits imposed by the superparamagnetic limit is the concept of patterned media. As opposed to conventional magnetic media, in which the magnetic media consist of uniform grains, patterned media consists of a plurality of "bit-islands" that each consists of a single grain or several linked grains. Adjacent bit-islands are separated from one another by non-magnetic material. In an effort to further increase density, a concentric track is divided into two or more sub-tracks, with each sub-track staggered in the cross-track direction from adjacent sub-tracks.

The use of patterned media, and in particular to patterned media comprised of sub-tracks, presents additional obstacles related to retrieval of data from the patterned media. For instance, the position of the transducer head relative to each sub-track affects the channel response, and thus, the ability of the system to accurately detect user data. Furthermore, inter-symbol interference (ISI), which refers to a signaling phenomenon in which adjacent symbols blur into one another, increases the complexity associated with decoding user data written to a patterned media.

Equalizers and detectors have been designed to deal with the increasingly complex task of decoding user data. However, most equalizers and detectors are designed for processing data from conventional media, not bit-patterned media. It would be beneficial to improve the design of equalizers and detectors to accommodate differences between conventional media and bit-patterned media.

SUMMARY

The present invention is directed to a system of decoding data from bit-patterned media (BPM), and in particular to BPM in which each data track is comprised of a plurality of sub-tracks. In one aspect, the present invention is directed to a multiple-input/multiple-output (MIMO) equalizer that is configured to receive a vector input that includes read-back signal samples corresponding with each of the plurality of sub-tracks and to generate in response a plurality of equalized outputs corresponding with each of the plurality of sub-tracks. A detector is configured to receive the plurality of equalized outputs provided by the MIMO equalizer and to generate in response a vector output that includes estimates corresponding with user data associated with each of the plurality of sub-tracks.

In another aspect of the present invention, an equalizer is comprised of a plurality of equalizer filters. Each equalizer filter is optimized for one of a plurality of transducer head positions. A detector and off-track estimator combine to detect the position of the transducer head based on a readback signal generated by the transducer head. An equalized filter optimized for the detected position of the transducer head is selected as the equalizer, and subsequently received readback signals are equalized by the selected equalized filter.

In another aspect of the present invention, an equalizer and detector employ a 2-stage process to detect user data. The detector is defined by a trellis that is used to estimate user data based on the equalized output provided by the equalizer. In the first stage, the equalizer and detector are optimized to detect the presence of strong bits associated with a sub-track located proximate to the transducer head. In the second stage, the trellis is modified based on the strong bits detected in the first stage. User data associated with other sub-tracks is detected based on the equalized output and the detector based on the modified trellis.

DETAILED DESCRIPTION

The present invention is directed toward equalizer designs for use in analyzing readback signals generated with respect to a bit-patterned media (BPM). In particular, an exemplary embodiment of the present invention is directed towards BPM comprised of a plurality of data tracks, each data track comprising a plurality of sub-tracks. In an exemplary embodiment, the present invention includes a multiple-input/multiple-output (MIMO) equalizer design that accounts for variations in the channel response associated with each sub-track by designing and operating the equalizer as a multiple input/multiple output (MIMO) system. In another exemplary embodiment, employed alone or in combination with the MIMO equalizer system, is an off-track aware equalizer that detects the position of a transducer head relative to the sub-tracks and selects an optimized equalizer-target pair based on the detected position. In another exemplary embodiment the detector, employed alone or in combination with other aspects of the invention, employs a two-stage equalization and detection process. During the first stage, a sub-track located proximate to the transducer head is identified and the bits associated with the proximate sub-track (i.e., strong bits) are detected by the equalizer and detector. In the second stage, the strong bits detected during the second stage are used to modify the trellis of the detector. Based on the modified trellis, the bits associated with the sub-track located distal to the transducer head (i.e., weak bits) are detected. Alone or in combination, each of these equalizer designs seeks to reduce errors associated with reading data from bit-patterned media.

Figure 1:
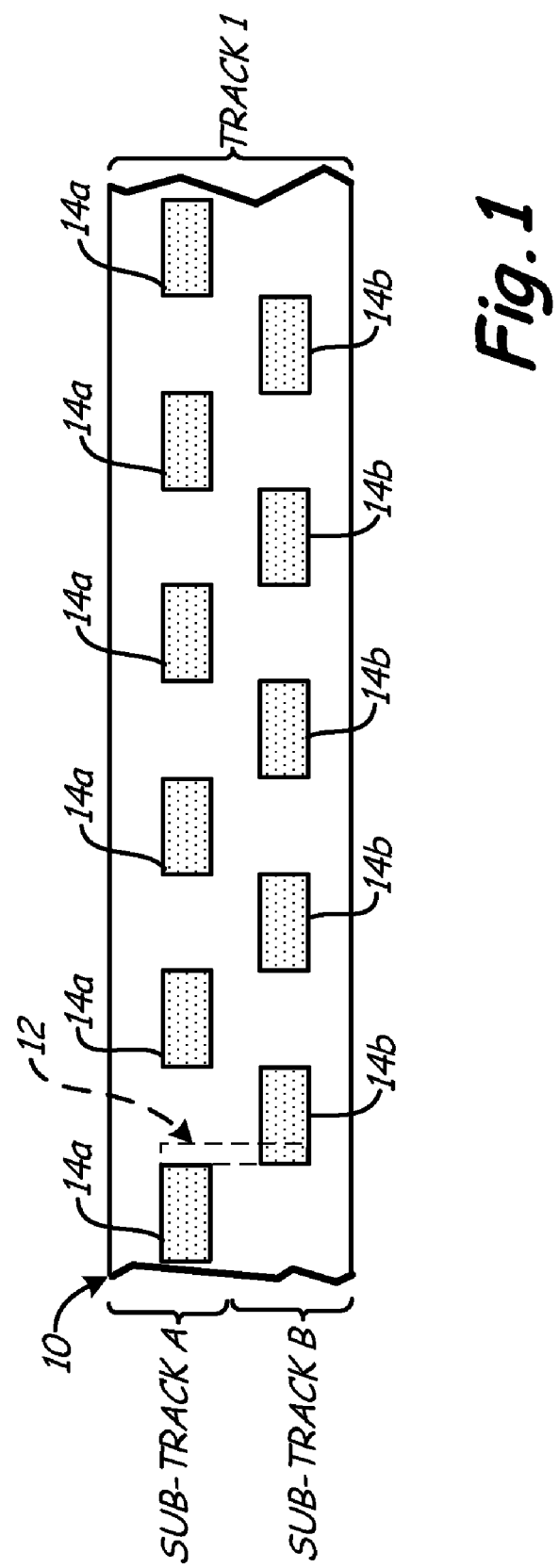
FIG. 1 is a top view of a patterned media that illustrates the placement of a transducer head relative to a track of data comprised of two sub-tracks.

FIG. 1 is top view of bit-patterned media (BPM) 10 and corresponding transducer head 12 positioned over one of a plurality of data tracks making up BPM 10. Bit-patterned magnetic media (BPM) have been proposed as a means for preventing magnetization reversal due to the superparamagnetic effect. A patterned medium may include a plurality of discrete, independent regions of magnetic material that form discrete, independent magnetic elements, which function as recording bits in the medium. The magnetic bits or elements are arranged in a regular pattern over the medium substrate. Typically, each bit or element has a small size and magnetic anisotropy such that, in the absence of an applied magnetic field, the magnetic moment of each magnetic bit or element is aligned along the same magnetic easy axis.

A number of topologies may be employed regarding the placement of bit-islands within BPM 10. In the example shown in FIG. 1, bit-islands are arranged in a staggered topology in which each data track is comprised of two sub-tracks. Data track 13 is therefore comprised of sub-tracks A and B. This topology is referred to as 'staggered' because the second sub-track is offset in the down-track position relative to the first sub-track. In the example shown in FIG. 1, sub-track A and sub-track B each include a plurality of individual bit-islands 14a and 14b, respectively. Each bit-island is separated by non-magnetic material 16, commonly referred to as a 'trough'. Transducer head 12 has a width large enough to allow it to be positioned over both sub-tracks simultaneously. Thus, transducer 12 generates a readback signal in response to both sub-track A and sub-track B.

Figure 2:
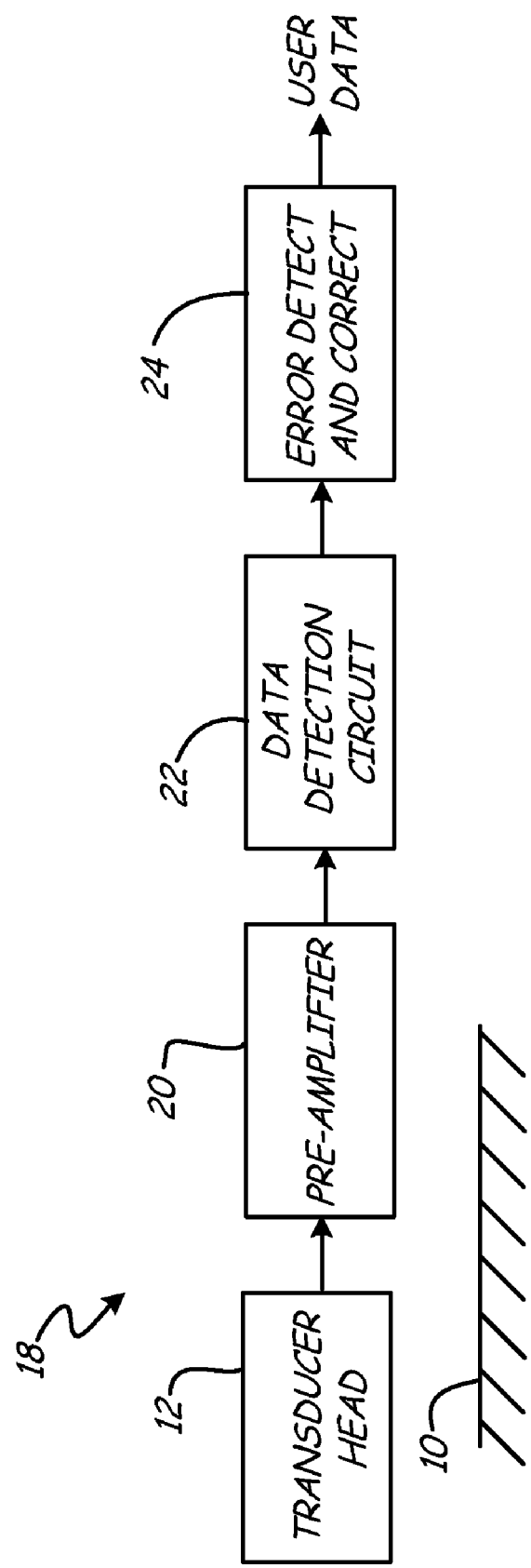
FIG. 2 is a block diagram of a components employed to read data from a patterned media.

FIG. 2 is a block diagram illustrating the connection of components employed to perform a read operation. During a read operation, transducer head 12 generates a series of pulses in response to magnetic fields on BPM 10. The resulting series of pulses generated by transducer head 12 is referred to generally as the readback signal. For example, in the staggered topology described with respect to FIG. 1, pulses generated by transducer head 12 would be in response to magnetic fields detected on both sub-track A and sub-track B. The resulting readback signal is amplified by preamplifier 20. The resulting amplified signal is provided to data detection circuit 22, which employs an equalizer and detector to detect and decode user data based on the provided readback signal. The present invention is directed towards the design of the equalizer and detector to improve the ability of data detection circuit 22 to accurately detect user data based on a readback signal generated with respect to a bit-patterned media.

In addition, the output of data detection circuit 22 is provided to error correction circuit (ECC) 24, which employs coding schemes to detect and correct errors in the user data. For example, ECC 24 may make use of parity bits encoded within the original data stream (referred to as 'inner code') that can be retrieved during readback.

Multiple-Input/Multiple-Output (MIMO) Equalizer

Figure 3:
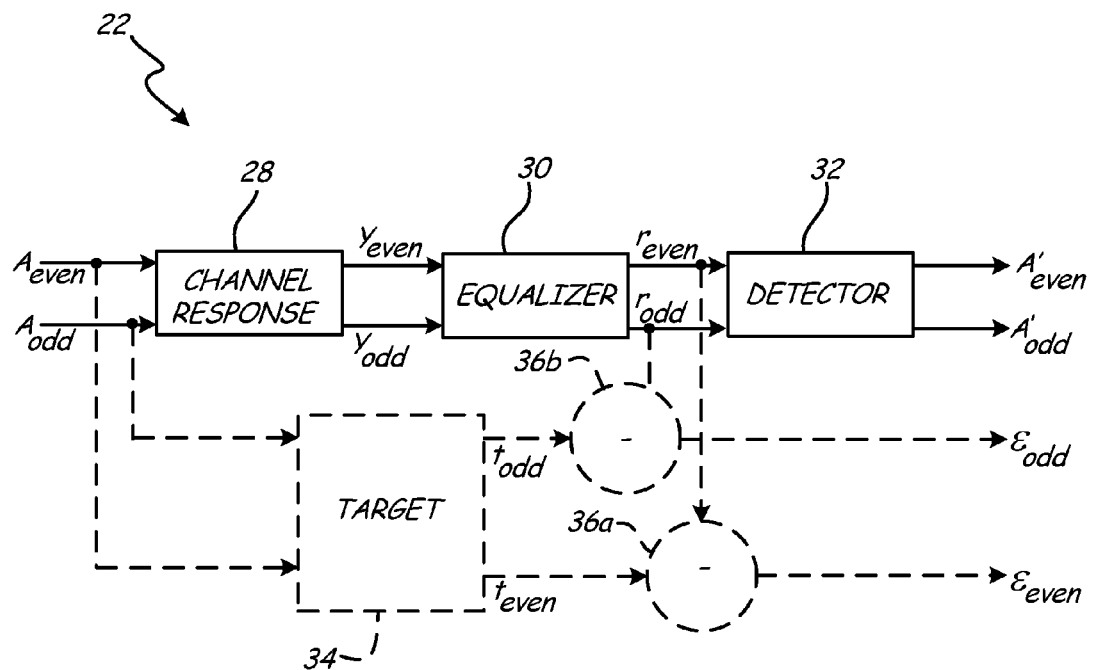
FIG. 3 is a block diagram illustrating in additional detail the design and operation of the data detection circuit.
Figure 4:
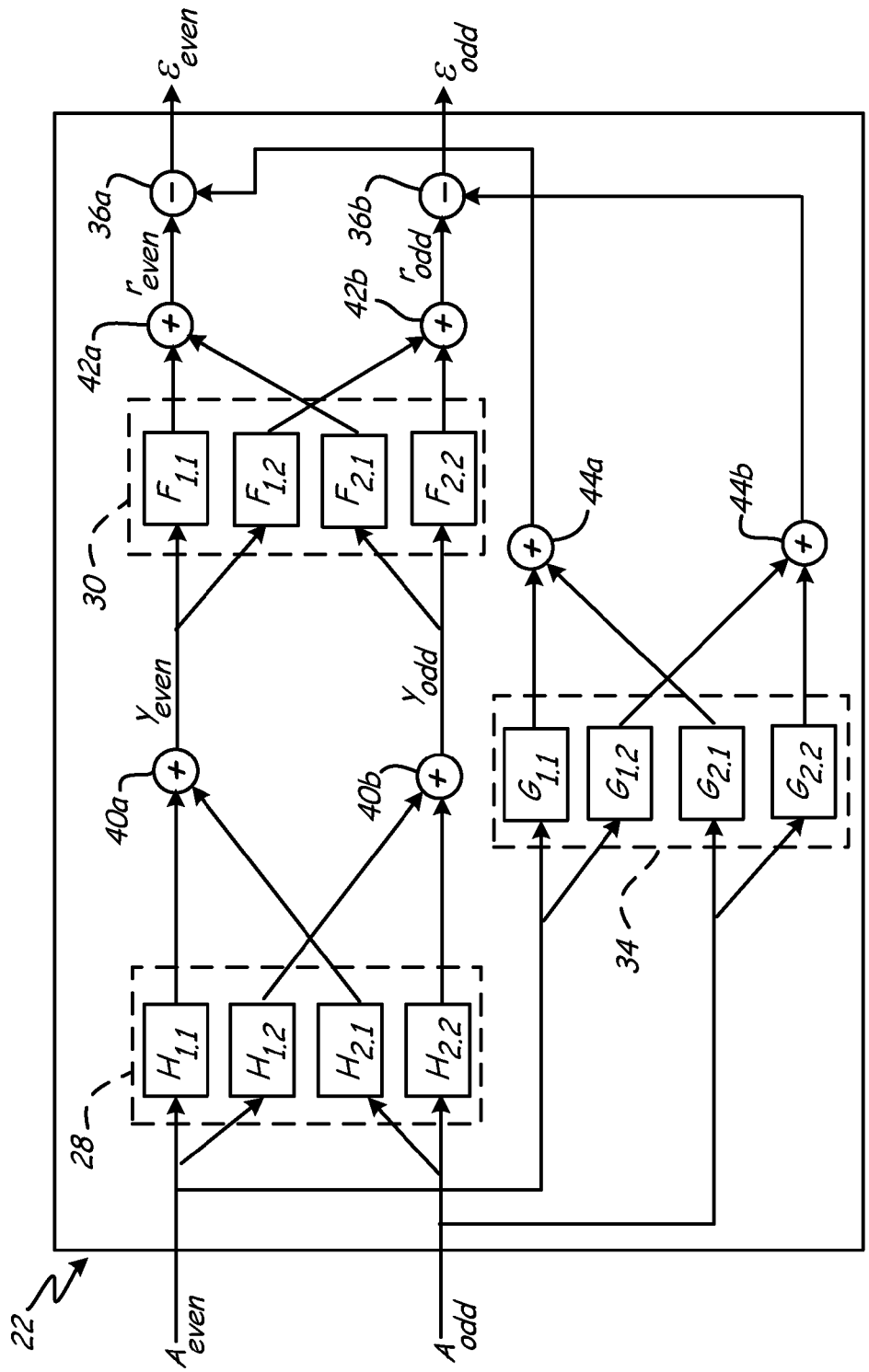
FIG. 4 is a block diagram illustrating the design stage of a multiple-input/multiple-output equalizer-target filter according to an embodiment of the present invention.
Figure 5:
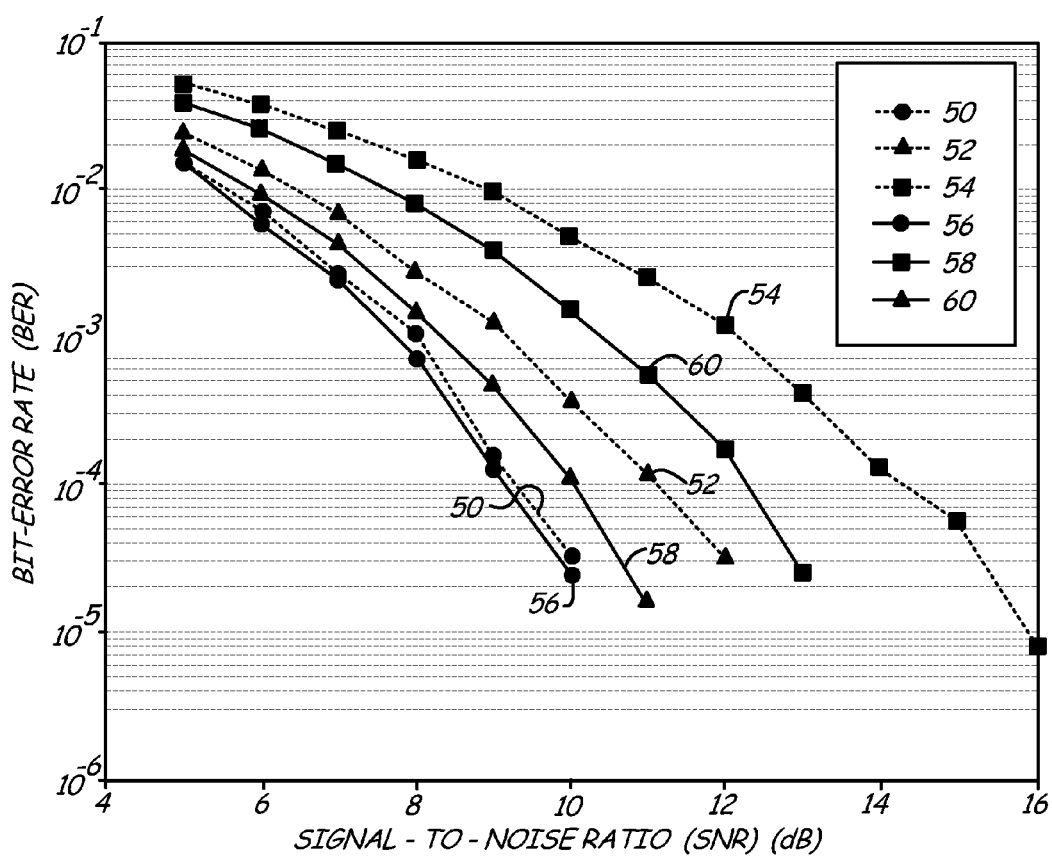
FIG. 5 is a graph illustrating the improved bit-error rate achieved with the MIMO equalizer-target filter designed according to an embodiment of the present invention.

FIGS. 3-5 illustrate an embodiment of the present invention that employs a multiple-input/multiple-output (MIMO) equalizer architecture. The MIMO equalizer architecture is designed to account for differences in the channel response between sub-tracks in a bit-patterned media, such as that shown in FIG. 1. FIG. 3 is a block diagram illustrating the basic architecture of data detection circuit 22 (as shown in FIG. 2) employing a MIMO equalizer according to an exemplary embodiment of the present invention. FIG. 4 is block diagram illustrating in additional detail the architecture of the MIMO equalizer according to an exemplary embodiment of the present invention, including in particular the design stage associated with the MIMO equalizer. FIG. 5 illustrates performance improvements of the MIMO equalizer as compared with traditional single-input/single-output (SISO) equalizer designs.

FIG. 3 is a block diagram illustrating the design and operation of data detection circuit 22 (as shown in FIG. 2), which includes channel response 28, equalizer 30, detector 32, target response 34 and error blocks 36a and 36b. Channel response 28 represents the effects associated with storing and reading user data from BPM 10. This includes effects associated with the media itself, effects associated with the transducer head in sensing the user data, and effects related to interference between adjacent bits of user data (e.g. intersymbol interference). Thus, channel response 28 is only meant to indicate the transformation of the user data that takes place as a result of storing and retrieving the user data to a magnetic medium. The output of channel response 28 represents the readback signal that would be received by data detection circuit 22 from transducer head 12 (as shown in FIG. 1).

In a conventional system, the channel response, equalizer, detector and target can be modeled and designed as a single-input/single-output (SISO) system. To optimize an equalizer-target pair for a conventional system, the known user data would be provided to a target filter and through the channel to the equalizer. The equalized output of the equalizer and the target response are compared, and the equalizer-target filter pair is modified until the average squared error is minimized. During operation, the readback signal provided by a transducer is equalized by the equalizer, and provided to the detector for decoding. The detector employs the target filter optimized as part of the equalizer-target filter pair to define a trellis. The trellis is used to analyze the likelihood associated with all possible sequence of bits, with the sequence identified as the most likely being selected as the estimated user data sequence.

The prior art system assumes that the channel response remains unchanged. Equalizers are therefore optimized for an expected on-track trajectory of a transducer head. In conventional systems, this assumption is relatively safe. However, in bit-patterned media employing multiple sub-tracks, the channel response may vary with respect to each sub-track. In particular, asymmetries associated with a transducer head may introduce asymmetries into the channel response depending on the sub-track being read. The present invention optimizes the equalizer and detector designs by assuming that instead of a single-input/single-output (SISO) system, the BPM employing multiple sub-tracks is in fact a multiple-input/multiple-output (MIMO) system.

As shown in FIG. 3, operating data detection circuit 22 as a MIMO system requires the artificial division of signals into a plurality of signals based on the number of sub-tracks employed by the bit-patterned media (e.g., two in the example shown in FIG. 3 based on two sub-tracks making up each data track). Thus, the user data provided to channel response 28 (as well as to target 34 during the design stage) is illustrated as two individual streams, $A_{even}$ and $A_{odd}$. This division is meant to illustrate the operations performed by channel response 28, but is purely theoretical. In actuality, user data would be provided to channel response 28 as a single stream. In response to user data $A_{even}$ and $A_{odd}$, channel response 28 generates a read-back signal. Once again, the read-back signal would in actuality include, after sampling, a sequence of real numbers. However, this sequence of real numbers can be grouped together with respect to each data track to generate read-back signal $y_{even}$ and $y_{odd}$, respectively.

For example, in the embodiment in which each data track includes two sub-tracks, the sampled readback signal is divided into an even readback signal $y_{even}$ and an odd readback signal $y_{odd}$, as shown in FIG. 3. Readback signal $y_{even}$ may correspond with a bit sampled at time t=2 (top sub-track) and readback signal $y_{odd}$ may correspond with a bit sampled at time t=3 (bottom sub-track). Grouping these elements together allows equalizer and detector to analyze the readback signals corresponding with the top sub-track and bottom sub-track simultaneously.

In response to the readback signal, equalizer 30 generates equalized response $r_{even}$ and $r_{odd}$. Likewise, target 34 generates two target responses $t_{even}$ and $t_{odd}$ in response to the user data. During the design stage, the equalizer-target filter pair is optimized by comparing the equalized responses $r_{even}$ and $r_{odd}$ with the target responses $t_{even}$ and $t_{odd}$, respectively, to generate error values $\epsilon_{even}$ and $\epsilon_{odd}$. Equalizers are optimized, for example, by minimizing the mean-squared error associated with error values $\epsilon_{even}$ and $\epsilon_{odd}$.

Having optimized the equalizer-target filter pair, the target is employed by detector 32 to define the trellis used to estimate the sequence of user data based on the equalized outputs generated by equalizer 30. In an exemplary embodiment, equalizer 30 and detector 32 are designed on the principle of partial-response, maximum likelihood (PRML). In this type of arrangement, the equalized outputs $r_{even}$ and $r_{odd}$ may include a controlled amount of inter-symbol interference that is left to detector 32 to decode. The trellis employed by detector 32 analyzes the likelihood associated with all possible sequences of user data, and selects the sequence that is most likely. The output $A_{even}'$ and $A_{odd}'$ of detector 32 indicates the estimate of user data written to sub-tracks of the bit-patterned media.

FIG. 4 is a block diagram illustrating in greater detail the design of equalizer 30 and detector 32 as a MIMO system. The input to channel response 28 represents user data written to a medium, and in particular to each sub-track of the medium. Because the medium in this example is a bit-patterned media wherein each data track consists of two sub-tracks, user data can be theoretically divided into user data corresponding with a top sub-track (e.g., $A_{even}$) and user data corresponding with a bottom sub-track (e.g., $A_{odd}$). Thus, the input to channel response 28 is described as a vector that includes user data associated with an even point in time (e.g., t=2) and user data associated with an adjacent odd point in time (e.g., t=3).

$$A = [A_{even}(D), A_{odd}(D)] \quad \text{Equation 1}$$

The vector A representing user data is applied to channel response 28 according to the following equation to generate the corresponding readback signal. In addition, the channel response H can be represented as a two input, two output system (corresponding with the presence of a first sub-track and a second sub-track), defined by the following 2×2 matrix of filters.

$$H = \begin{pmatrix} H_{1,1}(D), H_{1,2}(D) \\ H_{2,1}(D), H_{2,2}(D) \end{pmatrix} \quad \text{Equation 2}$$

The readback signal is thus defined by the multiplication of the user data vector A as applied to the channel response filters to define readback vector y, defined by the following equation.

$$\begin{pmatrix} y_{even}(D) \\ y_{odd}(D) \end{pmatrix} = \langle A_{even}(D), A_{odd}(D) \rangle \begin{pmatrix} H_{1,1}(D), H_{1,2}(D) \\ H_{2,1}(D), H_{2,2}(D) \end{pmatrix} \quad \text{Equation 3}$$

The combination of user data vector A with the channel response matrix H is illustrated graphically in FIG. 4, in which user data $A_{even}$ and $A_{odd}$ is applied to channel responses $H_{1,1}$ and $H_{1,2}$ to generate readback signal $y_{even}$. Likewise, user data $A_{odd}$ and $A_{even}$ is applied to channel response $H_{2,1}$ and $H_{2,2}$ to generate readback signal $y_{odd}$. In contrast with a conventional SISO channel response in which the channel response can be thought of as consisting of a series of numbers for each time-step, the channel responses $H_{1,1}$ and $H_{1,2}$ correspond with even and odd time-steps, respectively, of the top sub-track. That is, channel response $H_{1,1}$ may correspond with even time-steps (t=−4, −2, 0, 2, 4, etc.) that are in-phase with the bit-islands on the top sub-track. Channel response $H_{1,2}$ would then correspond with odd time-steps (t=−3, −1, 1, 3, etc.) that are out-of-phase with the bit-islands on the top sub-track, but in-phase with the bit-islands on the bottom sub-track.

The resulting readback signal generated as a result of channel response $H_{1,1}$ is combined with the output of channel response $H_{2,1}$ by summer 40a. Readback signal $y_{even}$ therefore represents the channel response at even time-steps, and takes into account the effect both the top sub-track and the bottom sub-track have on the resulting readback signal. The readback signal $y_{even}$ may be in-phase with the top sub-track, but because it takes into account the channel response based on both the top sub-track and the bottom sub-track we refer to it here as readback signal $y_{even}$. Likewise, the resulting readback signal generated as a result of channel response $H_{1,2}$ is combined with the output of channel response $H_{2,2}$ by summer 40b. The resulting readback signal $y_{odd}$ represents the channel response at odd time-steps, and takes into account the effect both the top sub-track and the bottom sub-track have on the resulting readback signal. The resulting readback signal $y_{even}$ and $y_{odd}$ are provided as inputs to equalizer 30.

As noted above, channel response 28 would in actuality generate a single stream of outputs, sampling of which provides a stream of real numbers representative of the user data written to the medium. The MIMO architecture groups together samples associated with each of the sub-tracks and analyzes them simultaneously. For instance, input provided to equalizer 30 may consist of a readback signal (e.g., $y_{even}$) corresponding with the top sub-track taken at time t=2, and a readback signal (e.g., $y_{odd}$) corresponding with the bottom sub-track taken at time t=3.

A benefit of treating the system as a multiple-input/multiple-output system is it allows equalizer and target filter pairs to be designed to account for differences in the channel response associated with a top sub-track and a bottom sub-track. In particular, the differences in the channel response associated with the sub-tracks are attributable, in large part, to asymmetries in the transducer head. In this way, employing a MIMO system (e.g., such as the two-input/two-output system shown in FIG. 4) allows asymmetries associated with the transducer head to be accounted for in the equalizer and target design process.

Both the equalizer and the target filters are also defined as matrices. For instance, in the embodiment employing two sub-tracks, equalizer 30 may be described by the following matrix:

$$F = \begin{pmatrix} F_{1,1}(D), F_{1,2}(D) \\ F_{2,1}(D), F_{2,2}(D) \end{pmatrix} \quad \text{Equation 4}$$

Similarly, with respect to the exemplary embodiment in which each data track includes two sub-tracks, target filter 34 may be described by the following matrix:

$$G = \begin{pmatrix} G_{1,1}(D), G_{1,2}(D) \\ G_{2,1}(D), G_{2,2}(D) \end{pmatrix} \quad \text{Equation 5}$$

In other exemplary embodiments in which each data track consists of some number n of sub-tracks, the matrices defined in Equations 2, 4 and 5 would be defined as n×n matrices.

The readback signals $y_{even}$ and $y_{odd}$ are provided to equalizer 30. Once again, the readback signals $y_{even}$ and $y_{odd}$ are treated as a vector that is applied to the matrix of filters making up equalizer 30 to generate a 1×2 output vector $[r_{even}, r_{odd}]$.

$$\begin{pmatrix} r_{even}(D) \\ r_{odd}(D) \end{pmatrix} = \langle y_{even}(D), y_{odd}(D) \rangle \begin{pmatrix} F_{1,1}(D), F_{1,2}(D) \\ F_{2,1}(D), F_{2,2}(D) \end{pmatrix} \quad \text{Equation 6}$$

Likewise, the original user data (once again, a 1×2 vector) is applied to the matrix representation of target filter 34.

$$\begin{pmatrix} t_{even}(D) \\ t_{odd}(D) \end{pmatrix} = \langle A_{even}(D), A_{odd}(D) \rangle \begin{pmatrix} G_{1,1}(D), G_{1,2}(D) \\ G_{2,1}(D), G_{2,2}(D) \end{pmatrix} \quad \text{Equation 7}$$

Design of the equalizer-target filter pair requires a constraint to be applied to the matrix of target filters G. In conventional optimization of the equalizer-target filter pairs, a monic constraint is employed to provide an optimal (in maximum likelihood sense) equalizer-target pair for systems with Gaussian noise. In an exemplary embodiment of the present invention, a monic determinant constraint is applied to target filter 34 that provides an optimal equalizer-target filter pair for maximum likelihood systems having Gaussian noise.

The respective outputs of equalizer 30 and target filter 34 are compared to one another by summers 36a and 36b to generate an error output vector $[\epsilon_{even}, \epsilon_{odd}]$. The equalizer matrix F and target filter matrix G are then optimized in a way that minimizes the resulting error output. In an exemplary embodiment, the matrices are optimized by minimizing the sum of the mean-squared error $\epsilon_{even}$ and $\epsilon_{odd}$ representing the difference between the equalizer output $r_{even}, r_{odd}$ and the target output $t_{even}, t_{odd}$, respectively.

As discussed above, having optimized the equalizer-target filter pair, the optimized target filter matrix G is employed by detector 32 to define the trellis employed to decode the equalized outputs $r_{even}, r_{odd}$ provided by optimized equalizer 30. Because the equalizer-target filter pair is defined as part of a MIMO system, the trellis associated with detector 32 will be defined to process equalized outputs $r_{even}, r_{odd}$ simultaneously. As a result, data detection circuit is able to minimize the errors associated with reading from a bit-patterned media.

FIG. 5 is a logarithmic graph comparing bit-error rates (BERs) associated with equalizer and detectors designed as a single-input/single-output (SISO) systems, and BERs associated with equalizer and detectors designed as a multiple-input/multiple-output (MIMO) system according to an embodiment of the present invention. The x-axis of the graph represents the signal-to-noise ratio (SNR) of each readback signal, expressed in decibels (dB). The y-axis of the graph represents BERs as a result of the corresponding SISO or MIMO read channel systems for a variety of SNR values. The y-axis is expressed on an logarithmic scale.

In particular, dashed lines 50, 52 and 54 represent the BER associated with a transducer head located in a first position (i.e., on-track, $\Delta=0$), in a second position (i.e., off-track, $\Delta=10$), and in a third position (i.e., off-track, $\Delta=-10$), respectively, as a result of equalization and detection based upon a SISO system as known in the prior art. Solid lines 56, 58, and 60 represent the BER associated with a transducer head located in a first position (i.e., on-track, $\Delta=0$), in a second position (i.e., off-track, $\Delta=10$), and in a third position (i.e., off-track, $\Delta=-10$), respectively, as a result of equalization and detection using a MIMO system according to an embodiment of the present invention.

As illustrated in FIG. 5, the use of the MIMO system results in substantial decreases in the BER. In particular, the BER is dramatically decreased for situations in which the transducer head is slightly off-track. For example, dashed line 52 represents the BER associated with a SISO system in which the transducer head is located in a slight off-track position. For the same position of the head, solid line 58 represents the BER associated with a MIMO system in which the transducer head is also located in a slight off-track position. Assuming a SNR of 13 dB, the MIMO read channel provides an order of magnitude improvement over the SISO reach channel.

In this way, replacing the SISO system, traditionally used to design equalizers and detectors for conventional magnetic media, with a multiple-input/multiple-output system that takes advantage of the division of data tracks into two or more sub-tracks improves the overall performance. In particular, the bit-error rate associated with the MIMO system is reduced beyond that which is capable with a traditional SISO system.

Off-Track Aware Equalizer

Figure 6:
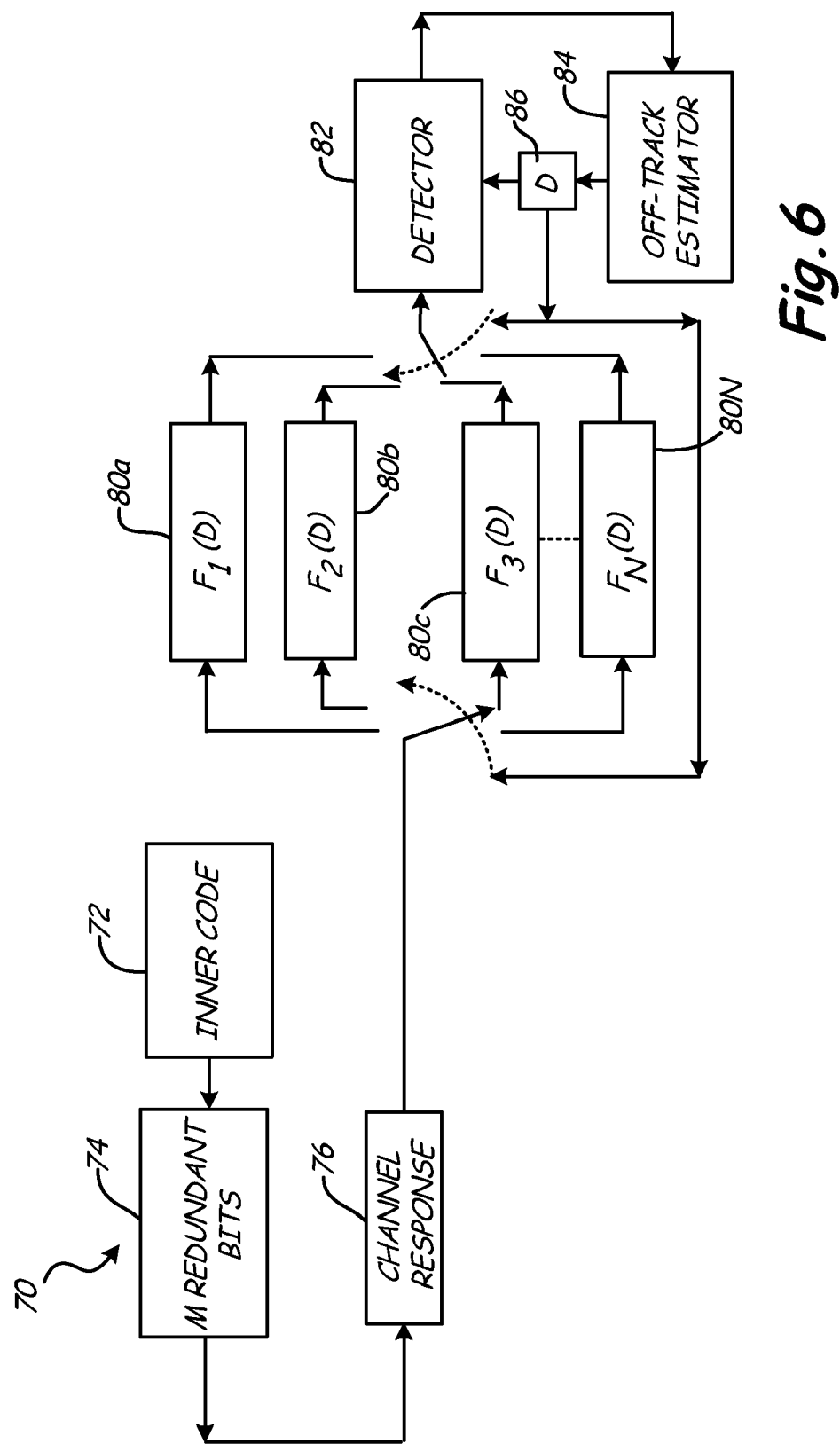
FIG. 6 is a block diagram illustrating an off-track aware equalizer according to an embodiment of the present invention.
Figure 7:
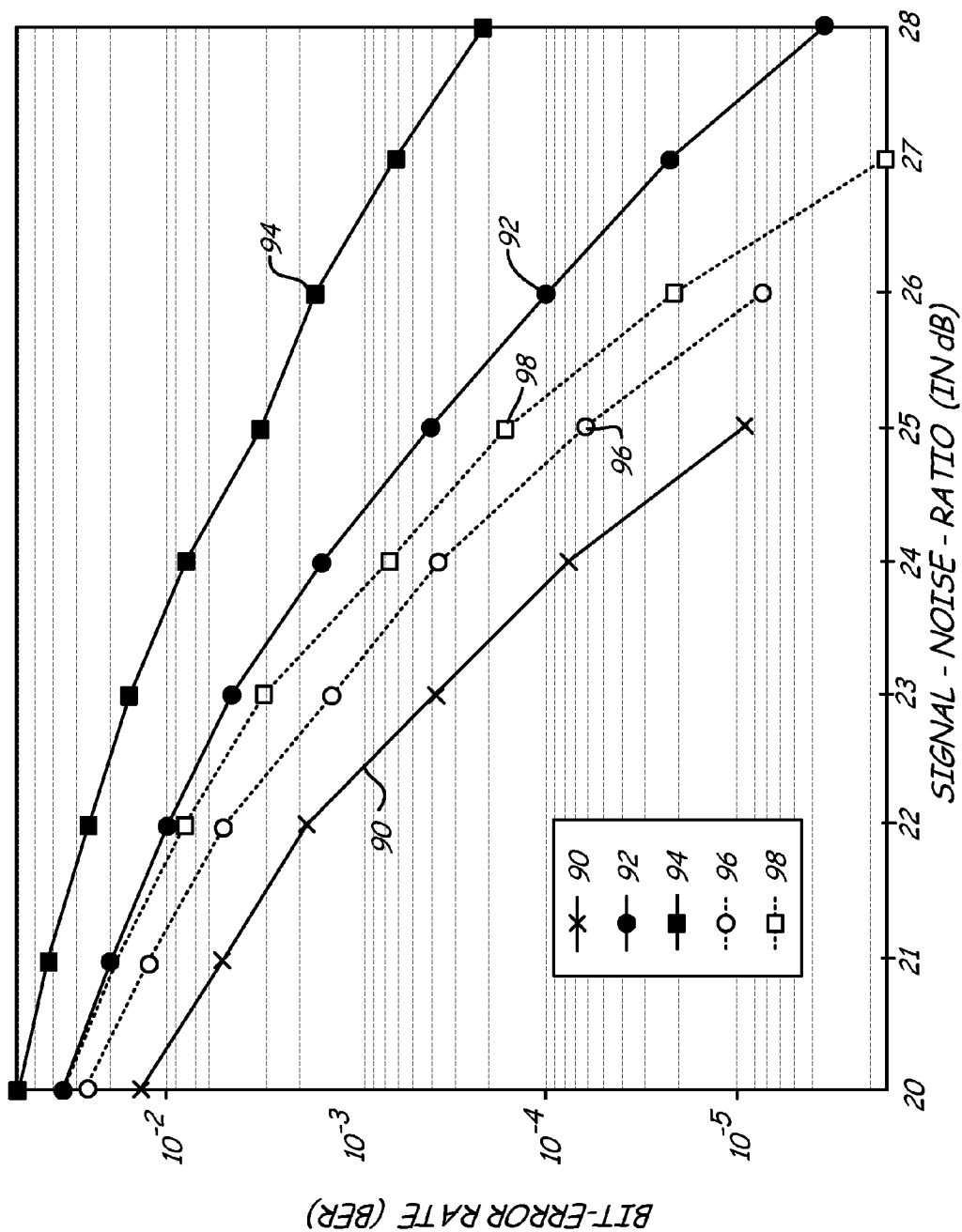
FIG. 7 is a graph illustrating the improved bit-error rate provided by an embodiment of the present invention.

FIGS. 6 and 7 illustrate an embodiment of the present invention that employs an off-track aware equalizer architecture. The off-track aware equalizer architecture is designed to detect the position of the transducer head relative to a desired data track. Based on the detected position of the transducer head, an equalizer filter optimized for the detected position is selected and applied to the readback signal. FIG. 6 is a block diagram illustrating an exemplary embodiment of the off-track aware equalizer architecture. FIG. 7 illustrates performance improvements of the off-track aware equalizer as compared with traditional equalizer designs.

FIG. 6 is a block diagram illustrating another exemplary embodiment of the present invention that selects equalizer and target filter pairs based on a detected position of a transducer head relative to a desired track. In the embodiment described with respect to FIGS. 4 and 5, it was shown that treating the read channel as a multiple-input/multiple-output system decreases the bit-error rate in a staggered bit-island topology. In addition, FIG. 5 illustrated that even in situations in which the transducer head was slightly off-track, the MIMO system reduced the bit-error rate when compared with a traditional SISO system. However, the MIMO system described with respect to FIGS. 3-5, while improving the BER associated with situations in which the transducer head is slightly off-track, did not seek to employ this information to select the equalizer-target filter pair.

In general, an equalizer and target filter pair is designed with the assumption that the transducer head will always be on-track. In the likely event that the transducer head is located slightly off-track, the performance of the equalizer and target filter pair becomes sub-optimal due to the change in the channel response associated with the transducer head moving off-track. The exemplary embodiment shown in FIG. 6, illustrates the benefit of designing a number of equalizer-target filter pairs based on a plurality of possible off-track positions (as well as an equalizer-target filter pair for an on-track position) associated with the transducer head. Based on a detected position of the transducer head, a corresponding equalizer-target filter pair is selected.

An exemplary embodiment of an off-track aware equalizer system 70 is illustrated in FIG. 6, which includes inner code 72, M redundant bits 74, channel response 76, a plurality of equalizer filters 80a, 80b, 80c, . . . 80N (referred to generally as "equalizers 80"), detector 82, off-track estimator 84, and delay element and equalizer selector 86.

Inner code 72 represents the encoded version of the user data that will be stored on the magnetic media. In this embodiment, M redundant bits 74 are included in the data written to the data sectors of the magnetic media. Redundant bits often refer to parity bits appended to the end of a data stream (e.g., inner code) that allows for error detection and correction during readback. In this example, an even number M of redundant bits are selected to be appended to inner code 72, wherein the redundant bits associated with the top sub-track are assigned a value of '1' and the redundant bits associated with the bottom sub-track are assigned a value of '−1'. Inner code 72 and M redundant bits 74 associated with the inner code are written to the magnetic media by a transducer head (not shown).

During a read operation, a readback signal is generated in response to inner code 72 and M redundant bits 74 appended to the inner code for a particular data track as indicated by the output of channel response 76. As discussed with respect to FIG. 3, channel response 76 represents the effects associated with storing and reading user data from a bit-patterned media (e.g., BPM 10 shown in FIG. 1). This includes effects associated with the media itself, effects associated with the transducer head in sensing the user data, and effects related to interference between adjacent bits of user data (e.g., intersymbol interference). Therefore, channel response 76 is once again only meant to indicate the transformation of the user data that takes place as a result of storing and retrieving the user data to a magnetic medium. The output of channel response 76 represents the readback signal that would be received by a data detection circuit (e.g., data detection circuit 22 shown in FIG. 3) and applied, in a conventional system, to an equalizer. In the exemplary embodiment shown in FIG. 6, the readback signal is provided to one of a plurality of equalizers 80 depending on the detected location of the transducer head.

In this exemplary embodiment, an initial data sector is employed to estimate the location of the transducer head. For example, a readback signal generated with respect to an initial data sector is equalized by one of the plurality of equalizers 80 and provided to detector 82. In response, detector 82 detects a specific pattern in the readback signal that is a result of the placement of the redundant bits and the position of the transducer head. Based on the detected specific pattern, off-track estimator 84 generates an estimate regarding the position of the transducer head. For example, the pattern may result in a DC shift detectable by detector 82. In this example, a positive DC shift indicates the transducer head is positioned closer to the top sub-track (e.g., sub-track written with redundant bits assigned a value of '1').

In response to the estimate of transducer head position, delay element equalizer selector 86 selects an equalization path (e.g., $F_1(D)$, $F_2(D)$, $F_3(D)$, etc.) for readback signals generated with respect to a subsequent data sector. In addition, detector 82 selects a trellis design based on the selected equalizer path. Readback of a subsequent data sector results in the readback signal being processed by an equalizer and detector optimized for detection based on the estimated position of the transducer head. In addition, readback of each data sector results in continually updated estimates regarding the position of the transducer head by off-track estimator 84.

In an exemplary embodiment, the plurality of equalizers 80 are designed off-line and then stored in a look-up table that is accessed by equalizer selector 86 based on the detected position of the transducer head. In other embodiments, the design of the equalizers 80 can be performed dynamically during operation based on the determined position of the transducer head. Other well-known techniques for designing equalizer-target pairs may be employed.

In addition, in the embodiment described with respect to FIG. 6, the position of the transducer head is determined by selectively encoding the redundant bits and using the selective encoding to detect a specific pattern in the readback signal. The redundant bits may be encoded prior to, within, or following a data sector. Other well-known methods of detecting or otherwise determining the position of the transducer head may be employed in conjunction with the present invention. In addition, the off-track aware equalizer system described with respect to FIG. 6 may be used in conjunction with the MIMO equalizer system described with respect to FIGS. 3-5, or in conjunction with conventional SISO equalizer systems as known in the prior art.

FIG. 7 is a logarithmic graph comparing bit-error rates (BERs) associated with read channels employing a conventional system employing the same equalizer-target filter pair regardless of transducer head position, and an exemplary embodiment of the present invention which employs an off-track aware equalizer system described with respect to FIG. 6. The x-axis of the graph represents the signal-to-noise ration of each readback signal, expressed in decibels (dB). The y-axis of the graph represents bit-error rates as a result of the corresponding conventional and improved equalizer systems for a variety of SNR values. The y-axis is expressed on an logarithmic scale.

Solid line 90 represents the BER associated with a transducer head that is on-track. Solid lines 92 and 94 represent the BER associated with a transducer head that is off-track by 20% and 30%, respectively. Dashed lines 96 and 98 represent the BER associated with a transducer head that is off-track by 20% and 30%, respectively, but employs an exemplary embodiment of the present invention to select an equalizer-target filter pair based on the detected position of the transducer head.

As illustrated in this example, selecting the equalizer-target pair based on the detected position of the transducer head provides significant improvement in the BER, particularly as the SNR increases. For example, assuming the transducer head is 20% off-track, the proposed system provides an order of magnitude improvement in the BER as compared to the conventional system assuming an SNR value of 26 dB. The improvement is even more dramatic as the transducer heads moves farther off-track. In another example, assuming the transducer head is 30% off-track, the proposed system results in a BER that is nearly two orders of magnitude improvement as compared to the conventional system assuming an SNR value of 26 dB. As described earlier, the off-track aware equalization system described with respect to FIG. 6 may be used with either the conventional SISO system or the proposed MIMO system described with respect to FIGS. 3-5.

Two-Stage Approach to Equalization

Figure 8:
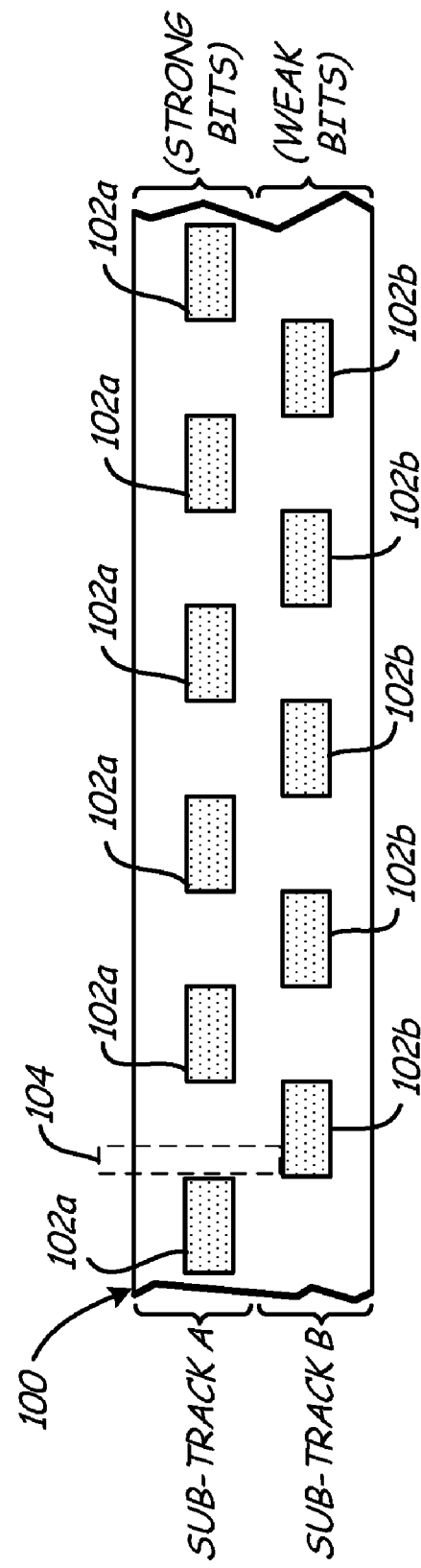
FIG. 8 is a top view of a bit-patterned media that illustrates the placement of a transducer head relative to a track of data comprised of two sub-tracks.
Figure 9:
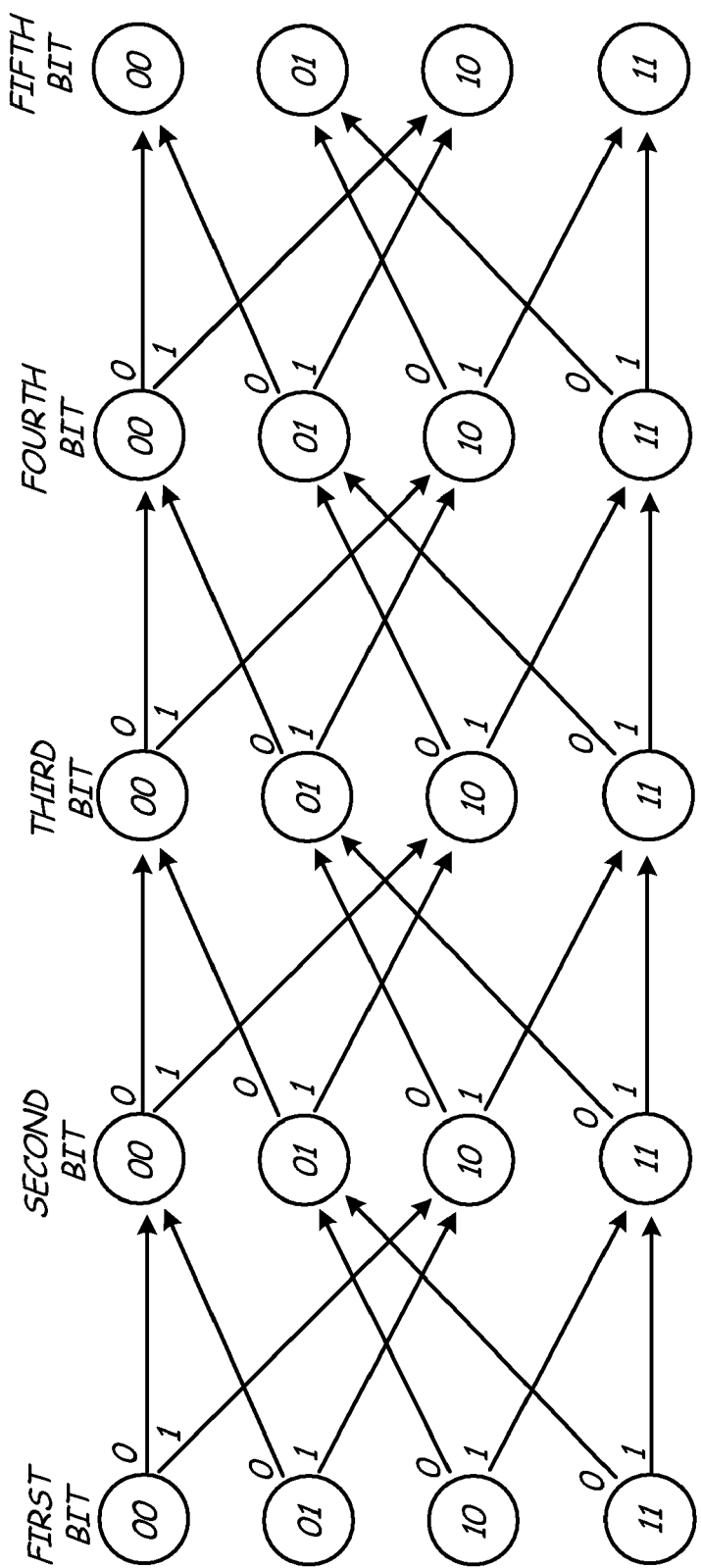
FIG. 9 is a state diagram illustrating a conventionally generated trellis employed by a detector known in the prior art.
Figure 10:
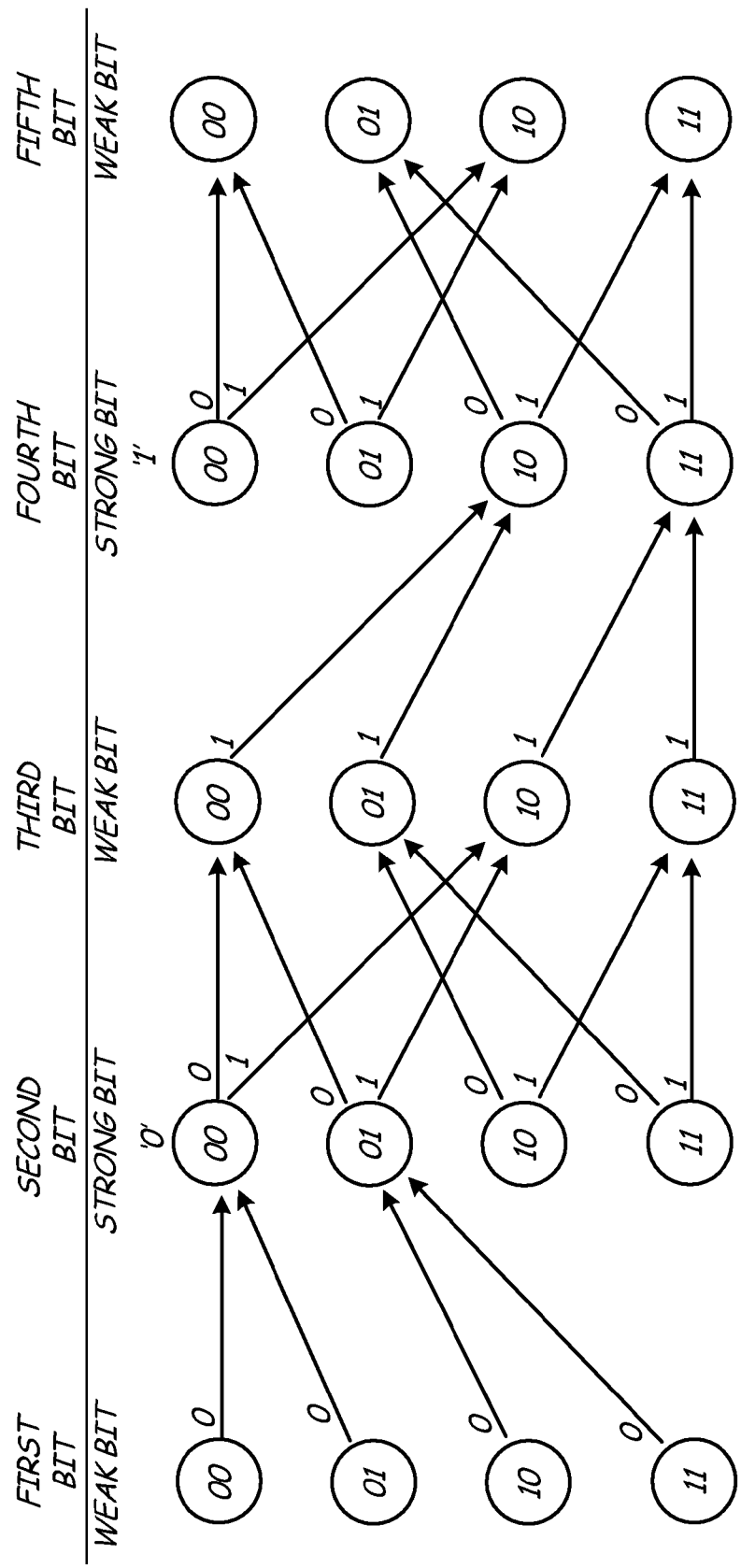
FIG. 10 is a state diagram illustrating a trellis generated as a result of a two-stage process of identifying bit-islands according to an embodiment of the present invention.

FIGS. 8-10 illustrate an embodiment of the present invention that employs a two-stage approach to equalization. In particular, the two-stage approach is designed to take advantage of bit-patterned media organized into a plurality of sub-tracks, and to allow for improved detection of each sub-track even in situations in which the transducer head is located off-track. FIG. 8 is a block diagram illustrating a first stage of the process, in which 'strong' and 'weak' bits are defined based on the location of the transducer head relative to a data track comprised of a plurality of sub-tracks. Stored values associated with the 'strong' bits are detected during a first stage. These values are provided to the detector (e.g., detector 32 shown in FIG. 3) to improve the detection of the 'weak' bits during the second stage. FIG. 9 illustrates a trellis associated with a detector in a conventional, one-stage detection method. FIG. 10 illustrates the resulting trellis employed by a detector during the second stage of the two-stage process.

FIG. 8 is a top view of a staggered, bit-patterned media that illustrates a two-stage approach to equalization and detection. Once again, patterned media 100 is illustrated in the staggered bit-island topology employing two sub-tracks (labeled 'sub-track A' and 'sub-track B') associated with each data track. As described with respect to FIG. 6, it is possible that transducer head 104 will deviate from the on-track position in the direction of either sub-track. As a result, the readback signal associated with the sub-track farthest from transducer head 104 is deteriorated slightly. However, the readback signal associated with the sub-track closest to transducer head 104 will remain strong.

Conventional equalizer-detector schemes do not account for the position of the transducer head, and thus do not take into account the effect of the transducer head being slightly off-track in one direction or another. As a result, errors are introduced into the readback of the sub-track located farthest from transducer head 104. For purposes of this discussion, the bit-islands (e.g., 102*a*) located on the sub-track located closest to transducer head 104 (e.g., sub-track 'A' in this example) will be designated as 'strong bits'. The bit-islands (e.g., 102*b*) located on the sub-track located farther from transducer head 104 are designated as 'weak bits'. These designations do not have anything to do with the bit-islands themselves, but rather the position of transducer head 104 relative to a particular sub-track.

In an exemplary embodiment, off-track estimator 84 (shown in FIG. 6) estimates the position of the transducer head. In other embodiments, other methods of estimating or otherwise determining the position of the transducer head may be employed. Based on the estimated position of the transducer head, bit-islands associated with the sub-track located proximate to the transducer head are designated as 'strong bits'.

During the first stage, the equalizer (as shown in FIG. 3 or 6) and detector (as shown in FIG. 3 or 6) are designed based on the detected position of the transducer head to detect the 'strong' bits. In an exemplary embodiment, equalizer and detector are selected as described with respect to FIG. 6, based on the estimated position of the transducer head. During the first stage, the readback signal corresponding to the weak bits is considered to be noise, and no attempt is made to detect them. In an exemplary embodiment in which each data track is comprised of two sub-tracks, only every other bit is processed during the first stage. The equalizer and detector may therefore employ filters having a tap spacing that results in processing of every other bit-island (i.e., the 'strong' bits).

During the second stage, the equalizer and detector operate to detect the presence of the weak bits, wherein the trellis associated with the detector is modified based on apriori information associated with the strong bits detected in the first stage to improve the detection of the weak bits. In particular, during the second stage the equalizer and target filters are designed to take into account both the 'strong' bits and the 'weak' bits. For instance, the tap spacing associated with the filters results in the processing of each bit-island. In addition, the trellis defined by the target filter is pruned based on the strong-bit estimates made during the first stage. This modified trellis is employed by the detector to detect the remaining 'weak' bits.

The difference between the conventional signal stage detection process as known in the prior art and the two-stage detection process of the present invention is illustrated in FIGS. 9 and 10. FIG. 9 is a state diagram that illustrates graphically the operation of the trellis employed by a detector as known in the prior art. The trellis essentially allows the detector to compute a metric associated with all possible combinations of n-bits of user data, with the value of n being determined by the channel response (e.g., memory associated with the channel) and desired performance of the system. The user data is estimated based on the computed metric indicating the maximum likelihood of a particular sequence (i.e., the minimum path through the trellis).

FIG. 10 is a state diagram illustrating the pruning of available paths based on the detection of strong bits during the first stage of the process. In the example shown, the first stage results in the detector identifying the second and fourth bits as the strong bits, with values of '0' and '1', respectively. In the second stage, the strong bits are used as apriori information to generate the pruned trellis illustrated in FIG. 10. With respect to the first bit (labeled as a 'weak' bit), knowledge that the next bit (a 'strong' bit) is a '0' narrows the potential paths that lead from the first bit to the second bit. That is, all paths that would require the next bit to be a '1' can be removed based on the knowledge that the next bit is in fact a '0'. Likewise, knowledge that the fourth bit is a '1' allows the pruning of paths leading from the third bit to the fourth bit. As a result of the pruned-trellis, valid detection of the weak bits employing a maximum likelihood calculation is improved.

Thus, the present invention defines methods and systems that seek to improve the equalization and detection associated with bit-patterned media. In particular, the present invention employs methods that take advantage of the use of sub-tracks, and in particular, staggered sub-track, to improve the equalization and detection process. Although the embodiments of the present invention have been described independently of one another, each of the embodiments is directed toward improved methods of reading data from a bit-patterned media, and each may be used in combination with other embodiments described.

Although the present invention has been described with reference to preferred embodiments, workers skilled in the art will recognize that changes may be made in form and detail without departing from the spirit and scope of the invention. In particular, the present invention has been discussed with respect to several examples that make use of staggered bit-patterned media employing two sub-tracks. In other embodiments, a plurality of sub-tracks may be employed without substantial change to the concepts described with respect to the present invention.

The invention claimed is:

1. A system for decoding data from a bit-patterned media having data tracks comprised of a plurality of sub-tracks, the system comprising:
a multiple-input/multiple-output (MIMO) equalizer configured to receive a vector input that includes read-back signal samples corresponding with each of the plurality of sub-tracks and to generate in response a plurality of equalized outputs corresponding with each of the plurality of sub-tracks;
a detector configured to receive a plurality of equalized outputs provided by the MIMO equalizer and to generate in response a vector output that includes estimates corresponding with user data associated with each of the plurality of sub-tracks; and
a multiple-input/multiple-output (MIMO) target filter to generate an optimized equalizer filter employed by the MIMO equalizer and an optimized target employed by the detector, wherein the optimized equalizer-target filter pair is optimized by comparing each of the plurality of equalized outputs generated by the MIMO equalizer with each of the plurality of target outputs generated by the MIMO target filter.

2. The system of claim 1, wherein the MIMO target filter is defined by a monic determinant constraint.

3. The system of claim 1, wherein each data track is comprised of a first sub-track and a second sub-track.

4. The system of claim 3, wherein the vector input provided to the MIMO equalizer includes a first sample of the read-back signal taken at an even time-step and a second sample of the read-back signal taken at an odd time-step, and generates in response a first equalized output and a second equalized output.

5. The system of claim 4, wherein the detector receives the first equalized output and the second equalized output, and generates in response estimates of user data associated with the first sub-track and the second sub-track.

6. The system of claim 4, wherein the MIMO equalizer includes: a plurality of MIMO equalizers, each of the plurality of MIMO equalizers optimized for one of a plurality of transducer head positions; and an off-track estimator that estimates the position of the transducer head relative to the data track being read, wherein one of the plurality of MIMO equalizers is selected based on the detected position of the transducer head.

7. The system of claim 6, wherein the estimate of the transducer head position is employed to identify a first sub-track located proximate to the transducer head and a second sub-track located distal to the transducer head.

8. The system of claim 7, wherein the off-track estimator selects one of the plurality of MIMO equalizers optimized to detect bits associated with the first sub-track located proximate to the transducer head.

9. The system of claim 8, wherein the detector is modified based on the detection of the bits associated with the first sub-track to detect bits associated with the second sub-track located distal to the transducer head.

10. A system for decoding data from a bit-patterned media having data tracks comprised of a plurality of sub-tracks, the system comprising:
an equalizer having a plurality of equalizer filters, each of the plurality of equalizer filters being optimized for one of a plurality of transducer head positions measured relative to a desired data track;
a detector operably connected to receive equalized outputs generated by the equalizer and to generate user data estimates based on the received equalized outputs; and
an off-track estimator that estimates a position of the transducer head based on the user data retrieved by the detector, wherein the off-track estimator selects one of the plurality of equalizer filters to apply to subsequent readback signals based on the detected position of the transducer head.

11. The system of claim 10, wherein the user data includes redundant bits written to each of the plurality of sub-tracks, wherein each of the plurality of sub-tracks is written with a pattern of redundant bits, wherein the detector detects a specific pattern associated with the redundant bits stored to the sub-track closest to the transducer head and the off-track estimator generates an estimate of the position of the transducer head based on the detected specific pattern.

12. A system for decoding data from a bit-patterned media having data tracks comprised of a plurality of sub-tracks, the system comprising:
an equalizer configured to generate an equalized output in response to a readback signal corresponding to a data track comprised a plurality of sub-tracks; and a
detector defined by a trellis that is used to estimate a sequence of user data, wherein during a first stage the detector detects user data associated with a first sub-track based on the equalized output, wherein the trellis is re-configured during a second stage based on the detected sequence of user data associated with the first sub-track such that subsequent sub-tracks are detected based on the equalized output and apriori information regarding the first sub-track.

13. The system of claim 12, further including: an off-track estimator that estimates a position of the transducer head based on the user data retrieved by the detector, wherein the equalizer and the detector process data bits associated with a data sub-track located proximate to the transducer head during the first stage and data bits associated with a data sub-track located distal to the transducer head during the second stage.

14. The system of claim 13, wherein the equalizer further includes: a plurality of equalizer filters designed for a plurality of transducer head positions, wherein the off-track estimator selects one of the plurality of equalizer filters based on the estimated position of the transducer head relative to the proximate data sub-track.

15. A method of designing an equalizer-target filter pair for use in combination with a bit-patterned media having data tracks comprised of a plurality of sub-tracks, the method comprising:
applying a vector comprised of readback signal samples corresponding with each of the plurality of sub-tracks written with known user data signals to a multiple-input/multiple-output (MIMO) equalizer to generate a plurality of equalized outputs;

applying a plurality of known user data signals to be written to each of the plurality of sub-tracks to a multiple-input/multiple-output (MIMO) target filter to generate a plurality of target response outputs; and optimizing the equalizer-target filter pair based on a comparison of each of the plurality of equalized outputs to each of the plurality of target response outputs.

16. The method of claim 15, wherein the MIMO target filter is constrained by a monic determinant constraint.

17. A method of reading user data stored on a bit-patterned media having data tracks comprised of a plurality of sub-tracks, the method comprising:

detecting data bits associated with a first sub-track located proximate to the transducer head during a first stage; and detecting data bits associated with a second sub-track located distal to the transducer head during a second stage based in part on the data bits detected during the first stage with respect to the first sub-track.

18. The method of claim 17, wherein detecting data bits associated with the first sub-track includes:

detecting a position of the transducer head relative to a data track being read;

selecting one of a plurality of equalizers based on the detected position of the transducer head, wherein each of the plurality of equalizers is optimized to a particular transducer head position;

applying the selected equalizer to a sampled readback signal associated with the first sub-track to generate a first equalized output; and applying a detector defined by a trellis to the first equalized output to detect the data bits associated with the first sub-track.

19. The method of claim 18, wherein detecting data bits associated with the second sub-track includes: modifying the trellis associated with the detector based on the detected data bits associated with the first sub-track; applying the selected equalizer to a sampled readback signal associated with both the first sub-track and the second sub-track to generate a second equalized output; and applying the detector defined by the modified trellis to the second equalized output to detect the data bits associated with the second sub-track.

20. A system for decoding data from a bit-patterned media having data tracks comprised of a plurality of sub-tracks, the system comprising:

a multiple-input/multiple-output (MIMO) equalizer configured to receive a vector input that includes read-back signal samples corresponding with each of the plurality of sub-tracks and to generate in response a plurality of equalized outputs corresponding with each of the plurality of sub-tracks;

a detector configured to receive a plurality of equalized outputs provided by the MIMO equalizer and to generate in response a vector output that includes estimates corresponding with user data associated with each of the plurality of sub-tracks, wherein the MIMO equalizer uses an optimized equalizer filter and the detector uses an optimized target, wherein the optimized equalizer filter-target filter pair is generated by a multiple-input/multiple-output (MIMO) target filter which compares each of the plurality of equalized outputs generated by the MIMO equalizer with each of the plurality of target outputs generated by the MIMO target filter.

* * * * *